US011108859B2

(12) United States Patent
Das et al.

(10) Patent No.: US 11,108,859 B2
(45) Date of Patent: Aug. 31, 2021

(54) INTELLIGENT BACKUP AND RECOVERY OF CLOUD COMPUTING ENVIRONMENT

(71) Applicant: Accenture Global Solutions Limited, Dublin (IE)

(72) Inventors: Jagaran Das, Durgapur (IN); Abdul Rahman Zafar, Plano, TX (US); Praveen Jadhav, Plano, TX (US); Supratim Bandyopadhyaya, Garulia (IN); Biswajit Rout, Kolkata (IN)

(73) Assignee: Accenture Global Solutions Limited, Dublin (IE)

( * ) Notice: Subject to any disclaimer, the term of this patent is extended or adjusted under 35 U.S.C. 154(b) by 30 days.

(21) Appl. No.: 16/119,351

(22) Filed: Aug. 31, 2018

(65) Prior Publication Data
US 2020/0007620 A1 Jan. 2, 2020

(30) Foreign Application Priority Data

Jul. 2, 2018 (IN) .............................. 201841024604

(51) Int. Cl.
*H04L 12/24* (2006.01)
*H04L 12/26* (2006.01)
*H04L 29/08* (2006.01)

(52) U.S. Cl.
CPC ...... *H04L 67/1095* (2013.01); *H04L 41/0856* (2013.01); *H04L 41/22* (2013.01); *H04L 43/045* (2013.01); *H04L 43/16* (2013.01)

(58) Field of Classification Search
CPC . H04L 67/1095; H04L 41/0856; H04L 41/22; H04L 43/045; H04L 43/16
See application file for complete search history.

(56) References Cited

U.S. PATENT DOCUMENTS 8,560,639 B2 * 10/2013 Murphy .............. G06F 11/1446
    709/219
8,769,049 B2 * 7/2014 Murphy .............. G06F 11/3034
    707/637

(Continued)

FOREIGN PATENT DOCUMENTS

WO    WO 2015/042688 A    4/2015

OTHER PUBLICATIONS

Extended Search Report from European Patent Application No. 19183218.7, dated Nov. 22, 2019, 13 pages.

(Continued)

*Primary Examiner* — Huy D Vu
*Assistant Examiner* — Bailor C. Hsu
(74) *Attorney, Agent, or Firm* — Crowell & Moring LLP

(57) ABSTRACT

A cloud control and management circuitry may provide both static rule based and intelligent dynamic backups of a cloud computing environment. The cloud control and management circuitry may monitor the operating status of the cloud computing environment, perform additional analytics on the monitored status, and provide an intelligent policy that is responsive to various levels of the computing entities of the cloud computing environment, and causes automatic backup to prevent unrecoverable and potentially unexpected failures. The cloud control and management circuitry further provide a uniform interface for automatically and intelligently controlling and predicting backup of the computing environment based on disparate cloud computing platforms.

18 Claims, 8 Drawing Sheets

(56) References Cited

U.S. PATENT DOCUMENTS

| | | | |
|---|---|---|---|
| 8,819,476 B2* | 8/2014 | Roth | G06F 11/2023 |
| | | | 714/1 |
| 8,924,328 B1* | 12/2014 | Kozlovsky | H04L 41/0816 |
| | | | 706/45 |
| 9,977,704 B1 | 5/2018 | Chopra et al. | |
| 10,067,692 B2* | 9/2018 | Liu | G06F 9/45558 |
| 10,338,991 B2* | 7/2019 | Nallabothula | G06F 11/2294 |
| 2010/0293147 A1* | 11/2010 | Snow | G06F 16/10 |
| | | | 707/640 |
| 2012/0089572 A1 | 4/2012 | Raichstein et al. | |
| 2014/0137112 A1* | 5/2014 | Rigolet | G06F 9/5022 |
| | | | 718/1 |
| 2014/0149354 A1* | 5/2014 | Chan | G06F 11/2038 |
| | | | 707/639 |
| 2016/0019317 A1* | 1/2016 | Pawar | G06F 16/128 |
| | | | 707/649 |
| 2016/0162369 A1* | 6/2016 | Ahn | G06F 11/1451 |
| | | | 707/654 |
| 2018/0060184 A1* | 3/2018 | Thakkar | G06F 11/1464 |
| 2018/0067819 A1* | 3/2018 | Kotha | G06F 9/45558 |
| 2019/0245736 A1* | 8/2019 | Savino | H04L 41/0253 |
| 2019/0384678 A1* | 12/2019 | Samprathi | G06F 9/45558 |

OTHER PUBLICATIONS

Office Action from European Patent Application No. 19183218.7, dated Oct. 2, 2020, 6 pages.

* cited by examiner

INTELLIGENT BACKUP AND RECOVERY OF CLOUD COMPUTING ENVIRONMENT

CROSS REFERENCES

This application claims priority to Indian Provisional Application No. 201841024604, filed on Jul. 2, 2018 and entitled "Intelligent Backup and Recovery of Cloud Computing Environment", which is herein incorporated by reference in its entirety.

TECHNICAL FIELD

This disclosure relates to backup and recovery of cloud computing environment in general and to integrated and intelligent backup and restoration of cloud computing environment at various computing levels based on real-time monitoring of the operation of the cloud computing environment.

BACKGROUND

Rapid advances in computing technologies, driven by immense customer demand, have resulted in widespread adoption of cloud computing systems for providing hardware and software computing need to organizational or individual users. Just like traditional data backup, snapshot backup (including hardware, software, and data statuses) may need to be maintained for an actively deployed cloud computing environment in case that all or part of the cloud computing environment needs to be quickly restored or re-instantiated to a recent healthy state to avoid excessive computing disruptions when the computing environment malfunctions or is otherwise unexpectedly down.

DETAILED DESCRIPTION

Figure 1:
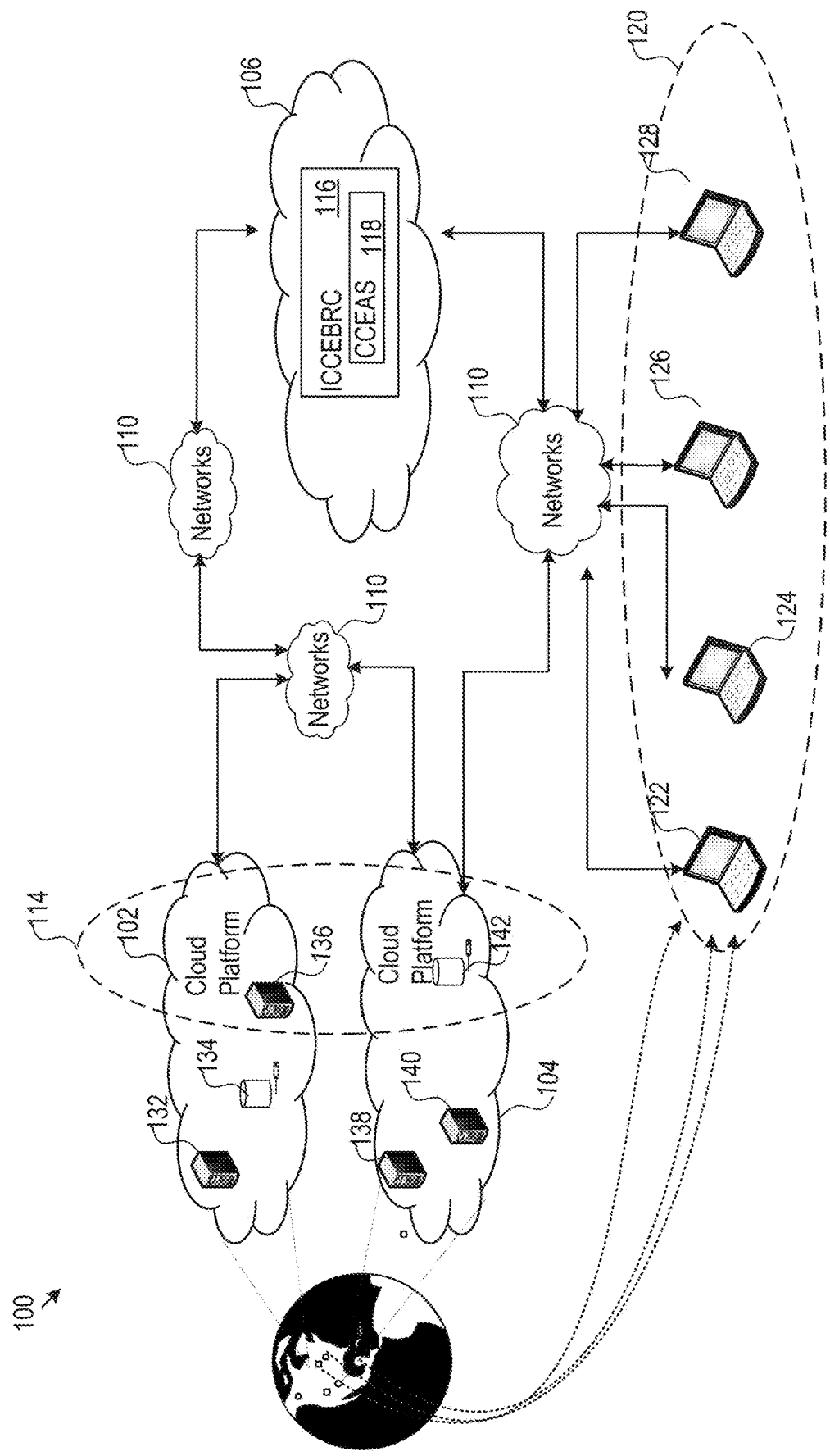
FIG. 1 shows an exemplary global system context for an intelligent cloud computing environment backup and recovery circuitry (ICCEBRC).

In cloud computing systems, computing resources such as virtual machines, memory, processor cores, serverless computing threads, and software components/systems may be requisitioned for planned or on-demand utilization. An organizational or individual user may request for a cloud computing environment including computing hardware and/or software for its computing need. The requested computing environment may be actively deployed to carry out computing tasks for the user. However, an actively deployed cloud computing environment may encounter various hardware and software problems which may lead to a loss of a current state of the computing environment and a loss of computation that has already been performed. As such, it may be desirable to maintain e.g., periodically or in real-time, snapshots of current configurational and operational states of the environment such that the computing environment may be restored quickly to recent healthy states in order to avoid deep computing losses. This is analogous to traditional data backup, except that it is more than backing up data consumed or generated by the computing environment, e.g., it also include operational and/or configurational information about particular cloud instances and their relation to the entirety of the computing environment.

This disclosure provides an intelligent cloud computing environment backup and recovery system (ICCEBRS, which can also be referred to as a cloud computing backup and recovery management system (BRMS)) including a cloud computing environment backup and recovery circuitry (ICCEBRC) for maintaining and managing cloud computing environment snapshots, backup, and recovery in real-time. The term "recovery" may herein be alternatively referred to as "restoration". In addition to traditional static rule based (e.g. scheduled backup) and/or manual on-demand backup and restoration, the ICCEBRS provides a backup and restoration that is dynamic, predictive and anticipatory. Specifically, the ICCEBRS can intelligently and automatically trigger backup and fast recovery/restoration of an actively deployed cloud computing environment further based on analyzing the operating status at various hardware and software levels in the cloud computing environment in real-time and predicting/anticipating potential issues in various cloud instances, volumes, and various hardware and software components. In contrast, traditional backup/restoration solutions based on, for example, predetermined backup schedules, are static and are not particularly responsive to unexpected problems at various levels in the cloud computing environment. The ICCEBRS implementations disclosed herein provide an unconventional and analytical solution for minimizing downtime and loss of computation by automatically monitoring the platform resources, performing analytics, and taking preventive steps in case a potential upcoming failure is predicted, in addition to regular static backup. The ICCEBRS implementations further flexibly provide recovery/restoration of instances from the backup from a set of available recovery points and provides cross-regional backup configuration that facilitates fast disaster recovery.

In addition, the ICCEBRS implementations disclosed herein augment a traditional cloud platform that by itself may provide none or insufficient backup support by enabling a full backup automation to a cloud computing environment deployed over such a cloud platform. For a cloud platform that already provides some basic backup support, the ICCEBRS implementations disclosed herein provide streamlined and expanded backup functions with additional automated and predictive intelligence. These implementations further provide a backup integrator for a cloud computing environment deployed across multiple cloud computing platforms and provide an integrated backup/restoration solution with predictive intelligence, regardless of the level of backup support in each of the underlying cloud platforms. These independent cloud platforms may include but are not limited to Amazon Cloud Services (AWS™), Azure™, and Google Cloud Platform (GCP™). The ICCEBRS implementations disclosed herein further provide a flexible and uniform user interface and portal that masks these various underlying distinct cloud computing platforms from a user.

The aspect of integrating backup/restoration of cloud computing environments across independent cloud computing platforms in a single ICCEBRS having a unified user interface and predictive intelligence is particular desirable since even though traditional discrete backup/restoration solutions based on static-rules may be offered, such traditional solutions for cloud computing environment backup/restoration are very platform specific and are usually unaligned with the requirement of a client operational perspective. While on-demand or managed backup/restoration of the cloud instances and services may be offered by some individual cloud platforms, there has been no common standard defined and it has been burdensome for a user to maintain backup jobs when the user has exposure to more than one cloud platforms. In addition, the traditional backup solutions lack analytical capability for predicting dynamic issues unexpected within a predefined set of rigid and static backup rules.

The implementations of the ICCEBRS herein aim to serve as a solution to various problems encountered in a cloud computing environment, including but not limited to:
- Backing up of cloud computing instances across more than one cloud provider (e.g., different cloud providers such as AWS™, Azure™ and GCP™)
- Recovering an instance from the backup to replicate the original instance.
- Intelligent auto failure discovery and recovery of cloud instances.
- Taking instance snapshots and software level.
- Disaster recovery of the cloud computing environment into an alternate region in the event of a regional outage.
- Scheduling a backup of some instances to trigger the backup automatically at some specified time.
- On-demand backup for any cloud computing components or instances.
- Maintaining multiple recovery point for instances.
- Recovering from the latest version of the instances or restoring some earlier versions of instances.
- Activating and deactivate a scheduled backup as and when required.
- Cleaning up of old snapshots after a definite duration.
- Monitoring the status of the scheduled backups.

As such, the cloud control and management circuitry discussed herein provides a cloud computing environment backup/restoration system as a technical solution to the technical problem of improving cloud computing reliability by adding intelligence and integration to the backup/restoration through performing analytics of the operating condition of the cloud computing environment and obtaining prediction of potential failures. The ICCEBRS and the corresponding ICCEBRC further use unconventional techniques to achieve an automatic, self-managed, real-time, preventive, and predictive backup of the cloud computing environment. The solution is rooted in computer technology as such problems do not have equivalents in other technical fields and cannot be performed in human minds. The solutions provided herein may further rely on various prediction models established or trained using historical operational and failure data and using machine-learning algorithms for performing analytics and prediction, and such analytics and prediction tasks are rooted in computer technologies and are not performable using pen and paper, or in human mind.

FIG. 1 shows a global cloud computing system 100 including a cloud computing management and control circuitry for deploying, backing up, and recovering cloud computing environments. In particular, the global cloud computing system 100 may include various cloud platforms 102 and 104, a cloud control and management circuitry 106, and user devices 120, 122, 124, 126, and 128 for accessing the cloud platforms 102 and 104, and for accessing the cloud control and management circuitry 106. As shown in FIG. 1, each of these system components of the global cloud computing system 100 may be located anywhere in the world and each system component may further be distributed over multiple geographical locations. All system components of the global cloud computing system 100 may be interconnected by communication networks 110. The communication networks 110 may include private and public wireless or wireline networks defined by, for example, any known network protocols and/or stacks.

The cloud platforms 102 and 104 may each provide various types of hardware resources including but not limited to core processors, program and data memories, permanent storages, and the like (illustrated by resources 132-142 of FIG. 1). These computing resources may be configured into higher level virtual resources such as virtual machines and virtual storage servers. Each of these virtual computing entities may be implemented as centralized or distributed physical hardware resources. Each of the cloud platforms 102 and 104 may provide an application programming interface (API) for requesting, accessing, configuring, backing up, commission, decommission, and scaling the computing resources and the computing environment in the cloud platform for a particular user. The cloud platforms 102 and 104 may be provided and provisioned by independent cloud vendors. As such, each cloud platform may provide its own cloud computing capabilities and specify its own API for requesting, allocating, backing up, recovering, and managing the cloud computing resources and cloud computing environment. Such cloud platforms 102 and 104 may also be interfaced through a multi-cloud management platform such as the Accenture Cloud Platform. As an example, cloud platforms 102 and 104 may include but are not limited to AWS™, Azure™, and GCP™.

The user devices or user device groups 122-128 may be enterprise or institutional user devices of enterprise user 120. Remote access by the user devices to the computing environment and/or the ICCEBRC may be gained via the communication network 110. A user device may take any suitable form including but not limited to personal desktop computer, a laptop computer, a mobile telephone, a personal digital assistance device, and the like.

Computing resources in the cloud platforms 102 and 104 may be allocated to a particular user or user group for a particular project. Each particular project may include one or more computing environments. A collection of software components needed for a particular computing environment may be installed to run on the allocated cloud computing resources. These software components may inter-communicate to form a software stack, which may, together with the computing resources allocated from the cloud platforms 102 and 104, form a cloud computing environment 114 for a user.

The particular cloud computing environment 114, may be configured to draw computing resources within a single cloud platform 102 or 104, or may alternatively be implemented across multiple cloud platforms, such as 102 and 104. In one implementation, different types of cloud resources from different cloud platforms may be combined to implement a particular cloud computing environment. For example, virtual machines of Google Cloud Platform™ may be configured together with storage services of AWS™ in a particular cloud computing environment.

A user may further be involved in multiple computing environments. While each of these computing environments may draw cloud computing resources limited to a single cloud computing platform, different computing environments may draw cloud computing resources from different cloud computing platforms. The user thus may need to manage and access multiple cloud platforms having distinct APIs for, e.g., backup/restoration functions.

A software components in the software stack of the cloud computing environment 114, including various software tools needed for the particular project as well as various operating systems, may be provided by the user for installation on the allocated computing resources in the cloud stack 114. Alternatively, the software components may be provided by the cloud platform vendors as a service. Further, the software components may be provided by third party software vendors.

The cloud control and management circuitry 106 of FIG. 1 may include an ICCEBRC 116. The ICCEBRC 116 may further include a cloud computing environment analytics stack (CCEAS) 118 as a basis for providing intelligence to the ICCEBRC. The CCEAS 118 may be responsible for receiving real-time or periodically updated operation status and system logs of the user cloud computing environment 114 detected by various monitoring agents deployed in the user cloud computing environment. These agents, for example, may monitor the status of hardware such as CPUs, memories, storage disks, network interfaces, and the like. They may further monitor the operational status of software. Software upgrades, maintenance including patch installations may also be monitored. The CCEAS 118 may further perform analytics of the cloud computing environment to provide diagnostics of potential issues, and provide various predictions for the future operation and potential failure modes of the cloud computing environment. For example, the CCEAS 118 may be implemented as one of the analytics stacks described in U.S. patent application Ser. No. 15/925,075, Indian Patent Application No. 201741013376 (and corresponding U.S. patent application Ser. No. 15/637,953), and Indian Patent Application No. 6730/CHE/2015 (and corresponding U.S. patent application Ser. No. 15/378,244) the entirety of which are incorporated herein by reference.

The cloud control and management circuitry 106 including the ICCEBRC 116 may be implemented using dedicated servers, storage hardware, and other computing recourses necessary for supporting its intelligent backup/restoration control functions. Alternatively, as shown in the system configuration 200 in FIG. 2, the cloud control and management circuitry 106 and the ICCEBRC 116 may themselves be implemented as centralized engines and applications in a cloud computing environment, as shown by 202 of FIG. 2. In the configuration of 200 in FIG. 2, the computing environment 202 for the ICCEBRC is depicted as being implemented separately from the user cloud computing environment 114. The operating status of various computing components in the user cloud computing environment 114 may be monitored within the environment 114 using monitors 210. The monitored data may be communicated to the ICCEBRC 116 in the environment 202 for analytics via communication network 110. The term "centralized" is used to refer to the separation of the cloud computing environment 202 and the user cloud computing environment 114 in FIG. 2, rather than requiring that the ICCEBRC 116 be geographical centralized. In some implementations, computing components including virtual computing components for the computing environment 202 of the ICCEBRC 116 may be distributed across geographical regions.

Figure 2:
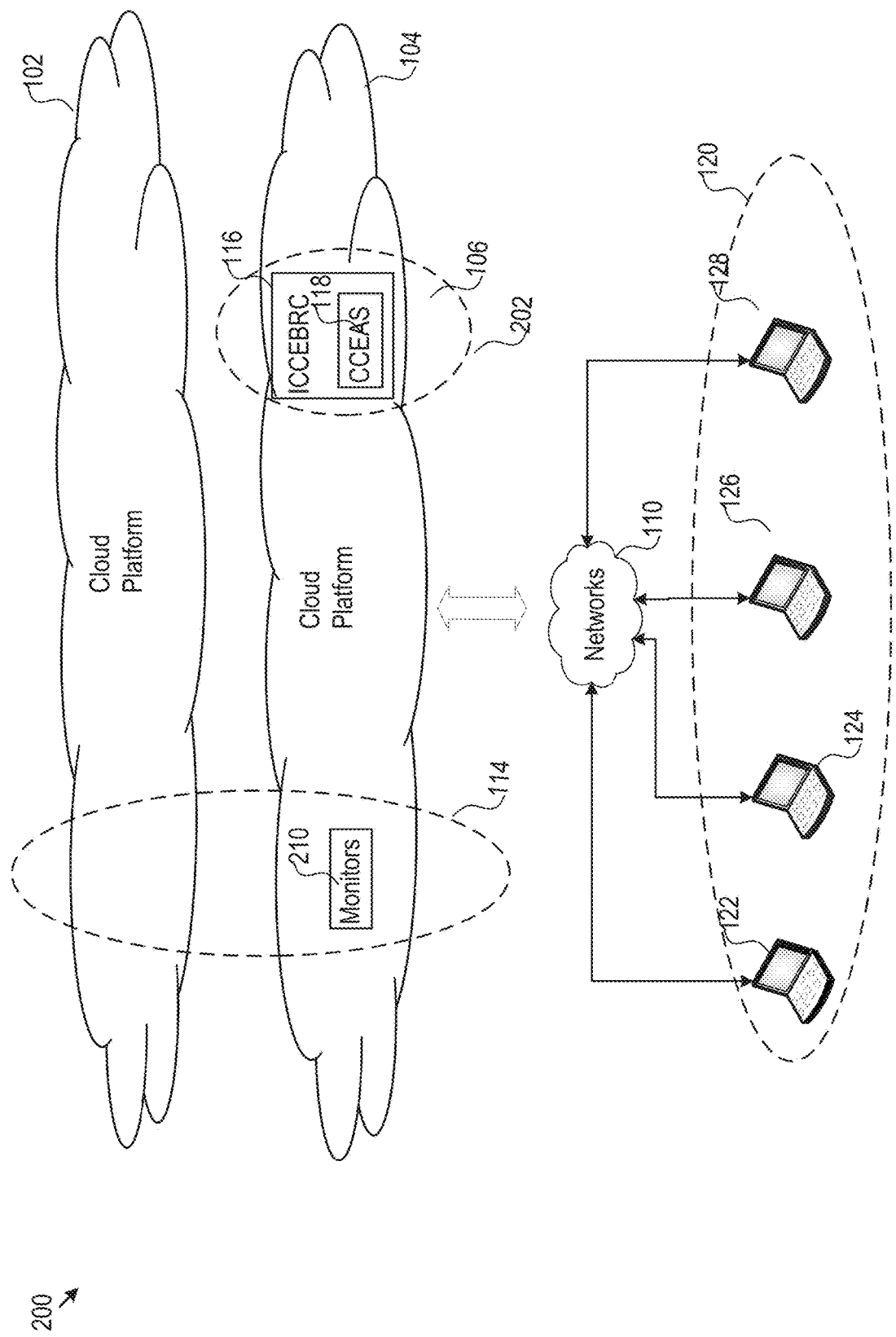
FIG. 2 shows an exemplary global system context for an ICCEBRC hosted and implemented in cloud.

In some implementations alternative to FIG. 2, the cloud control and management circuitry 106 and the ICCEBRC 116 may be entirely implemented as applications and engines inside the user cloud computing environment 114. Such an implementation is particularly useful in the situation where a single cloud platform is relied on for the user cloud computing environment 114 since main communications needed by the ICCEBRS with the rest of the system in such an implementation may not need to go across different cloud computing platforms.

In other implementations alternative to FIG. 2, the deployment of the cloud control and management circuitry 106 and the ICCEBRC 116 may take a mixed approach. Specifically, the ICCEBRC 116 may be partially implemented as centralized engines and applications in a cloud computing environment separate from the user cloud computing environment 114, and partially implemented as applications and engines inside the user cloud computing environment 114. Such implementation is particularly useful for an ICCEBRC that integrates backup and restoration control across multiple cloud computing platforms. The purpose for implementing some of the functions of the ICCEBRC in the user cloud computing environment 114 is to improve system efficiency by placing these functions closer to the user. Applications and engines that run in the user cloud computing environment in this implementation may be installed and configured when the user computing environment is requisitioned and instantiated.

Figure 3:
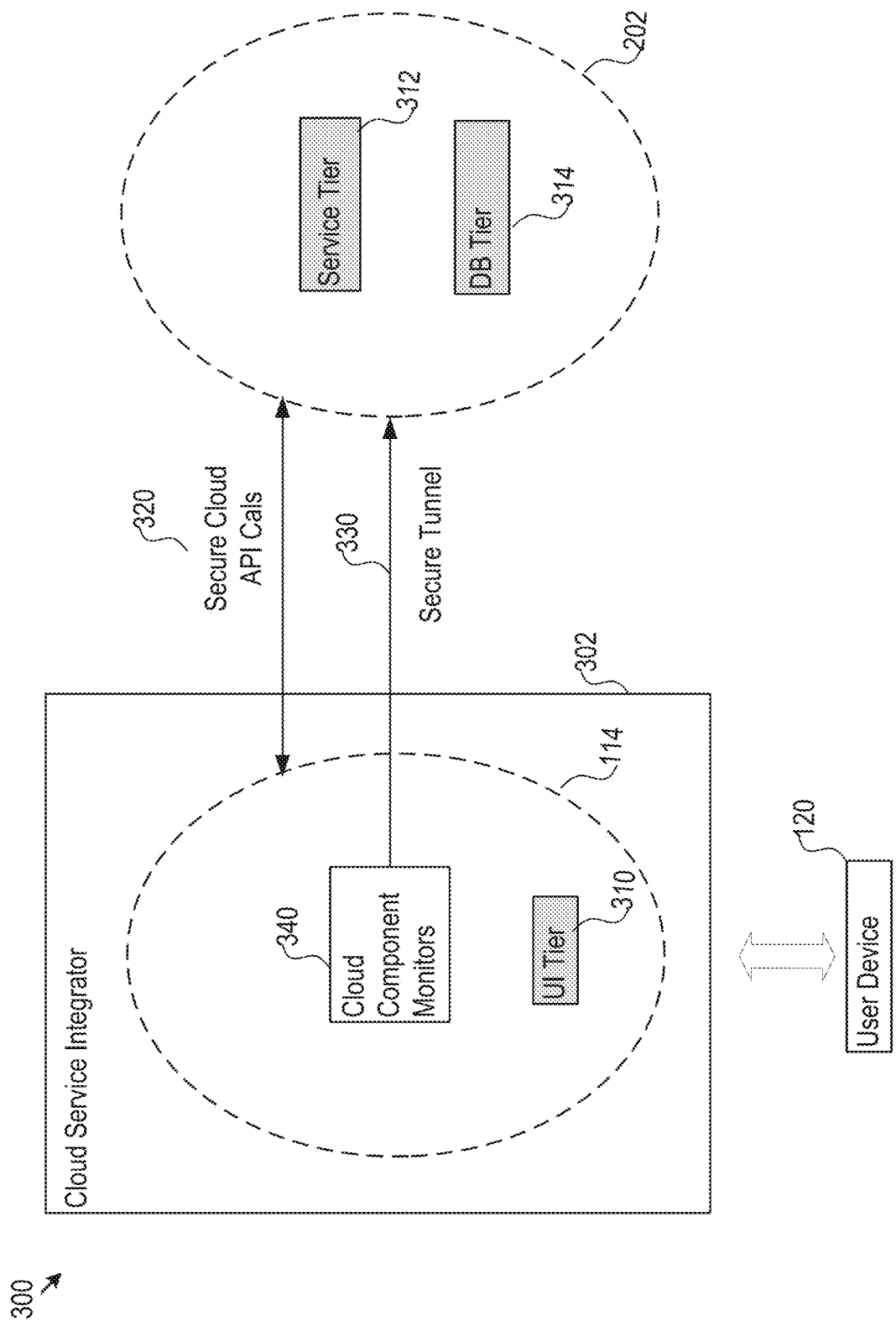
FIG. 3 shows an exemplary architectural view and deployment tiers of an ICCEBRC.

One example of such mixed approach is shown in FIG. 3. In the implementation 300 in FIG. 3, the ICCEBRC may include three different deployment tiers: the user interface (UI) tier 310, the service tier 312, and the database or data store tier (herein referred as data store tier) 314. Among these three tiers, the service tier 312 and the data store tier 314 may be implemented in the cloud computing environment 202 independent of the user cloud computing environment 114. In one implementation, the service tier 312 and the data store tier 314 may be implemented and hosted in a persistent cloud computing environment in AWS™ platform including C3 instances. In some implementations, the data store tier 314 may be implemented as a high-performance Mongo DB non-SQL database. The UI tier 310, however, may be implemented within the user cloud computing environment 114. As such, the UI tier may not be persistent. In other words, the UI tier 310 may be installed and configured at or after the time the user cloud computing environment 114 is instantiated and deployed.

The user device 120 may access the ICCEBRC via the UI tier 310. Because the UI tier 310 is implemented in the user cloud computing environment 114, the user access to the ICCEBRC would have low latency in connection and communication with the ICCEBRC applications which may be the heaviest part of the solution disclosed herein with respect to network traffic load. In one implementation, the user interface of the ICCEBRC may be based on, e.g., HTML5 and Angular JS framework. The UI tier may be AJAX based and implemented as a client tier to service tier 312. The service tier 312 correspondingly may function as a web server.

Computing components at various levels in the user cloud computing environment 114 may be monitored by the cloud component monitors 340. An example of monitoring system with plugin agents may be provided by Nagios™. The monitors 340 may further obtain real-time data from data sources such as various system and component logs. The status directly or indirectly monitored by these monitoring agents may include but are not limited to: CPU, memory and disk usage of various software components; network activities; loss of network connectivity; loss of system power; kernel power event reported; software issue on physical hosts; critical events reported in system logs; kernel panic or taint reported in system logs; IO error reported in system logs or key service logs; disk corruptions/bad sectors/high usage reported in file system scans; CPU/memory usage beyond safe limit beyond allowed duration; addition of storage; removal of storage; modification of network configuration and subnets; CPU/memory scale-up or scale-down; software patching event; software updates; antivirus/malware scan status and reports; accidental removal or outage.

These monitored parameters may be communicated to the ICCEBRC environment 202 in a secure manner periodically or in real-time, as shown by 330 in FIG. 3. Such communication may be implemented using secure tunnels and/or special communication ports. For example, the communication may be secured by a chosen network layer security (VPN, etc.).

In the implementation of FIG. 3, the service tier 312 of the ICCEBRC may be responsible for controlling the backup/restoration of the user cloud computing environment 114. The backup/restoration of various instances in the environment 114 may be initiated by the service tier 312 of the ICCEBRC using various API calls into the cloud computing platforms underlying the user cloud computing environment 114. The form of API calls and the scope of backup/restoration functions that may be performed by these cloud computing platforms may vary depending on the capability of these cloud computing platforms. These API calls, for example, may be communicated to the cloud platforms in a secure manner, as shown by 320 in FIG. 3. In one implementation in which backup in AWS™, GCP™, and Azure™ platforms is managed by the ICCEBRC, the service tier 312 may be implemented as a REST web application and may utilize spring framework along with GCP™ and AWS™ SDK libraries for its API callouts to GCP™ and AWS™ platform and plain REST API call outs to Azure™ platform.

The user cloud computing environment 114 may be further encapsulated by a cloud service integration layer 302. Such integration layer may provide a unified service and interface for users to manage deployment, resource allocation, maintenance, decommission, and other aspects of their cloud computing environment. For example, such an integration service may be implemented as Accenture Cloud Platform™. In conjunction with the ICCEBRC, users may be provided access to managing the operation as well as backup/restoration of their cloud computing environment with automated and real-time intelligence.

Figure 4:
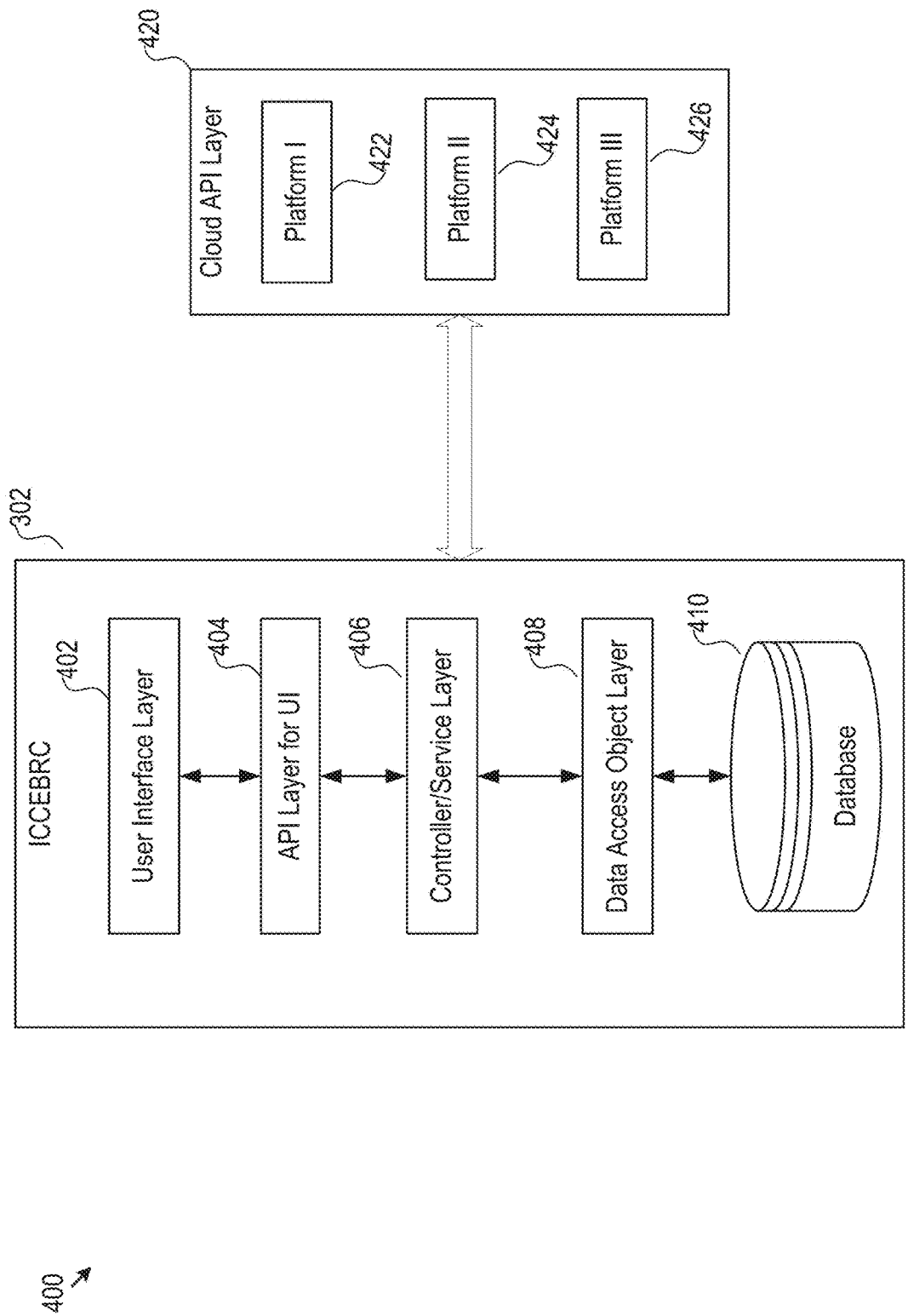
FIG. 4 shows an exemplary layered application stack of an ICCEBRC.

FIG. 4 further shows a stack application implementation 400 for the ICCEBRC in multiple layers. The ICCEBRC stack may include backup/restoration controller/service layer 406, drawing on resources from database 410 via a data access object layer 408, and communicating to a user interface layer 402 via a user interface API layer 404. The ICCEBRC makes calls via the cloud APIs 420 to the various cloud platforms 422, 424, and 426. In particular, the user interface layer 402 constitutes the view and visualization part of the ICCEBRC application, responsible for providing an interactive view to the user for giving inputs to the ICCEBRC application or for displaying response output. The user interface API layer 404 constitutes all of the APIs (e.g., REST APIs) of the ICCEBRC application that may be called by, e.g., the user interface layer 402. The controller/service layer 406 may comprise several sublayers. For example, it may comprise controller sublayer and a service sublayer. The controller sublayer, for example, may be responsible for mapping the REST API calls with corresponding URLs and calling appropriate service methods. The service sublayer, for example, may comprise actual analytic logic to perform the operations depending on the requirements of the requested API calls. The service sublayer may interact with the cloud APIs and data access object layer 408 during its course of execution. The data access object layer 408 may provide methods to access application data objects in database 410. It may be called upon by the service layer 406 to access the database.

Figure 5:
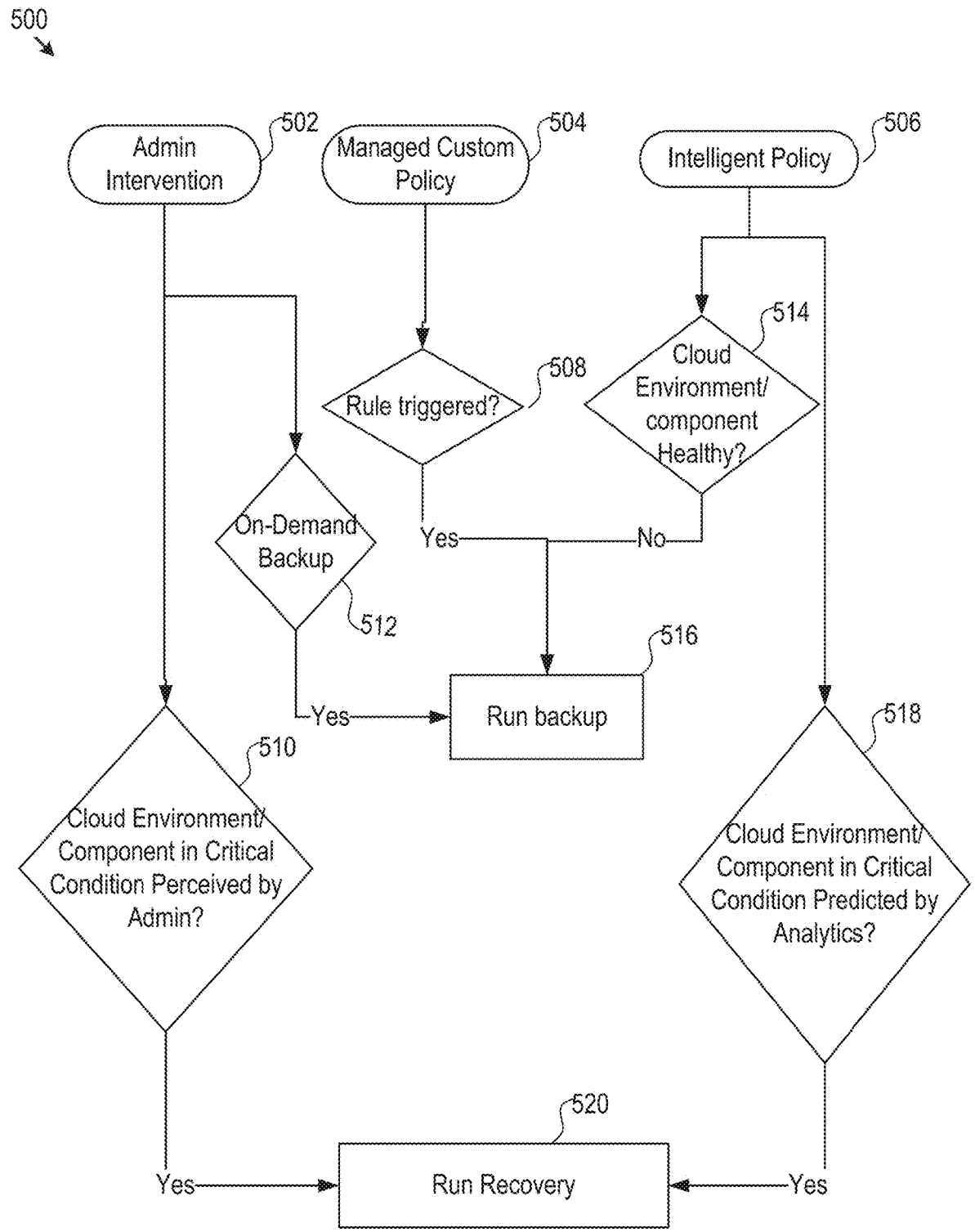
FIG. 5 shows an exemplary logic flow of cloud computing environment backup and recovery via various pathways including an intelligent policy pathway.

The controller/service layer above constitutes the main application engine of the ICCEBRC for automatically and intelligently controlling the backup/restoration of a user cloud computing environment. In one implementation, the ICCEBRC may include logic and analytics for managing backup/restoration of the user cloud computing environment via several parallel pathways. The logic flow shown in FIG. 5 provides an exemplary implementation 500. In FIG. 5, backup/restoration of a user cloud computing environment may be managed in three different pathways, including a manual administrator intervention pathway 502, a managed custom policy pathway 504, and an intelligent policy pathway 506.

In the manual pathway 502, an administrator of the user cloud computing environment may ascertain a need for backup/restoration and manually trigger backup/restoration accordingly. For example, the administrator may perform an on-demand backup (512 and 516) or may perceive that the cloud environment or a cloud computing component is in critical condition and manually trigger partial or full restoration of the user cloud computing environment (510 and 520).

The managed custom policy pathways 504 may be used to execute static rule based backup/restoration. In particular, a set of static custom rules may be established and managed by the ICCEBRC. Backup may be automatically executed when any one of the rules is triggered (508 and 516). Alternatively, such static rules may be formatted and communicated to the cloud platforms and the backup operations may be managed within the cloud platforms. These static rules may be general or instance specific. The static rules may be set at various hardware and software levels. The static rules, for example, may be based on a static backup schedule. As such, backup at various levels of the user cloud computing environment may be performed at regular times. The static rules may further specify a number of versions of backup versions at various levels. Alternatively or additionally, the static rules may specify a retention time period for each backup. Because multiple historical versions of various instances, volumes, and components may be retained, recovery may be made to any of these versions.

The intelligence policy pathway 506 may monitor and perform analytics on various operating parameters discussed above to execute additional intelligent backup/restoration. For example, the ICCEBRC may determine and predict the health condition of the user cloud computing environment at various hardware/software and system/component levels (514). When the health level of a particular component or instance falls below a threshold level, the ICCEBRC may automatically trigger backup (516). The ICCEBRC may further predict whether the cloud environment as a whole or as individual components is likely heading towards a critical condition by performing analytics on the monitored operating parameters and historical data (518). When the ICCEBRC predicts that the cloud environment may be heading to a critical condition, it may then run an automatic backup and restoration at an appropriate level and using an appropriate version of the backup (518 and 520).

Depending on the level of problems anticipated or predicted by the ICCEBRC, backup may be automatically performed at corresponding levels. The ICCEBRC thus may provide multilevel intelligent backup and restoration of a cloud computing environment. These levels may include individual software application level, software stack level (full stack or partial stack), virtual machine level, the entire cloud computing environment, or any level in between. By monitoring the operation of the cloud computing environment and performing analytics, issues at these various levels may be predicted by the ICCEBRC 116. Backup on these levels and any other intermediate levels may be performed dynamically and in real-time.

Backup at a particular level in 516 (via any of the pathways in FIG. 5) may be implemented as a snapshot that contain sufficient description of the current hardware/software composition of the level and the current runtime status of the level. The snapshot may be stored and used as a blueprint by the cloud computing platform to generate a replacement instance at the particular level. For example, a running application may be backed up intelligently and the backup may contain sufficient information for restoring the active application to its prior health running state without change in the underlying hardware configuration when a problem associated with the application cause it to crash. In another extremely, the entire cloud computing environment including all the hardware and software may need to be backed up if a large scale failure in the cloud computing environment is predicted to occur.

Figure 6:
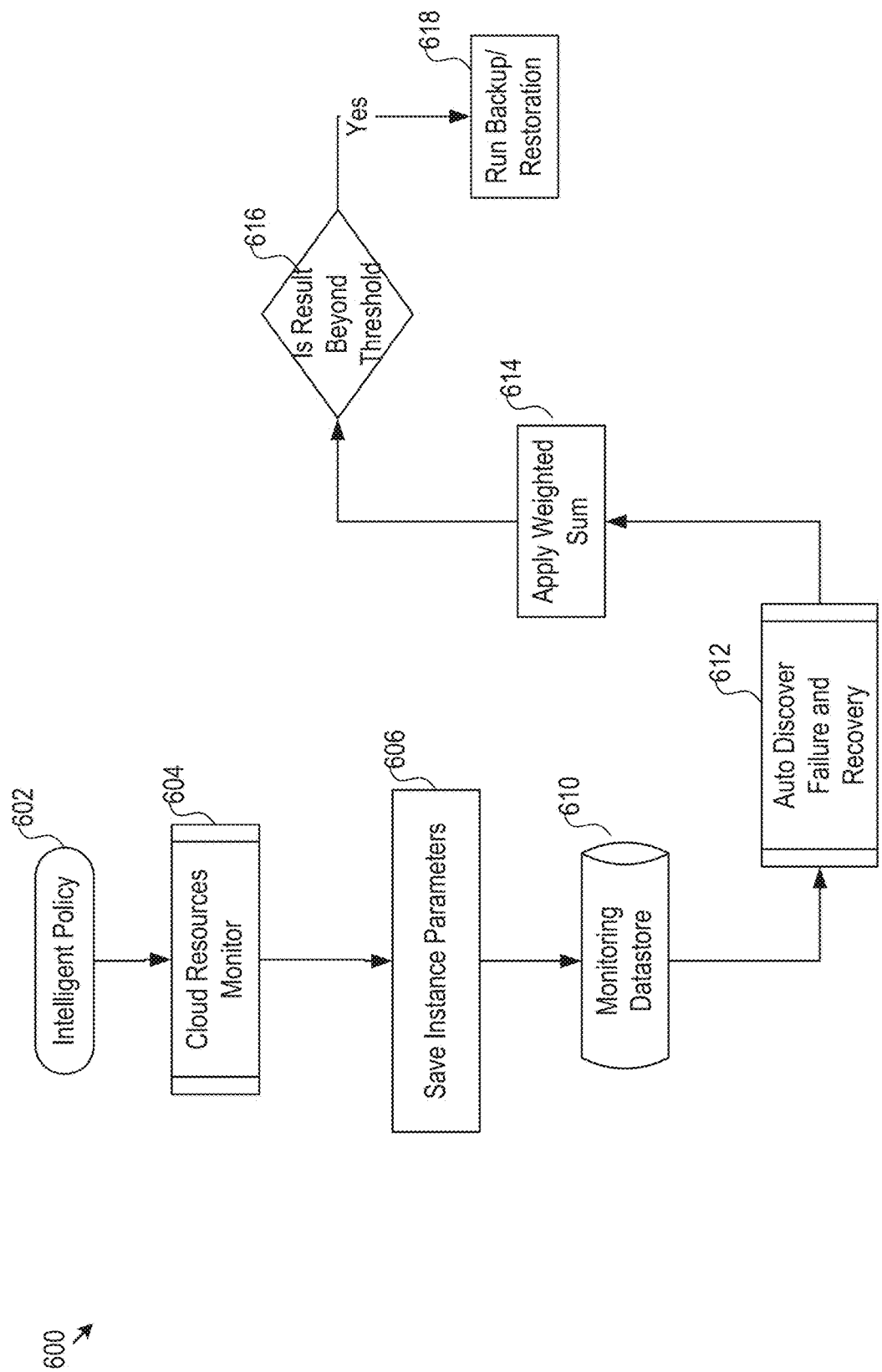
FIG. 6 illustrate an exemplary logic flow for an intelligent policy pathway of an ICCEBRC.

FIG. 6 further illustrate an exemplary logic flow 600 for backup/restoration based on intelligent policies. The logic flow 600 includes monitoring cloud resources in the user cloud computing environment (604) and record various operational and status parameters for cloud instances (606). The logic flow 600 may further include monitoring data store (610) for log entries and records and dynamic user rules (that need to interpreted based on analytics of the operation of the user cloud computing environment, in contrast with static rules such as backup schedules discussed above). The ICCEBRC may then gather these parameters and data to conduct analytics and perform auto discovery of failure (612) on the parameter level. The ICCEBRC may further combine parameter level prediction using weighted sum to obtain overall failure discovery and prediction scores as will be further illustrated in examples below (614). The prediction scores may then be compared against various score thresholds and decision logic within the ICCEBRC to form backup/restoration decisions as to instances and time (616). The backup decisions may be executed (e.g., by API calls to the cloud platform via the user cloud computing environment) according to instances and time (618).

In some implementations, the intelligent policy above can be based on a scoring analytics to perform auto failure prediction/discovery, backup, and restoration. The following are exemplary failure indicators that can be obtained via analytics and recorded for the user cloud computing environment and used for the performing auto failure prediction. Each of these failure indicators may be provided with a weightage. These indicators may be combined by weightage for overall auto failure prediction and for triggering auto backup/restoration.

For example, a system status check may be performed and weighed to predict needs for backup/restoration. In particular, system status check may be obtained to detect any abnormality with various computing instances. A system status check failure could be the result of any of the below underlying failure mode or indicators. These indicators may be obtained by performing analytics on various parameters and data monitored by the monitoring agents deployed in the user cloud computing environment and/or derived in system logs and events recorded in the user cloud computing environment. These indicators may provide a binary indication or probabilistic value of whether the various failure conditions described in the table below is detected. The binary indicators or probabilistic indicators may be obtained using a trained model (using machine learning algorithms based historical operational data monitored by similar user cloud computing environments and failure data). These indicators may further be given weightages as exemplarily illustrated in the table below. These weightages, for example, may be determined using a predictive model of the ICCEBRC based on machine learning algorithms and data associated with historical failure records.

| # | Parameter | Weightage(W) |
|---|-----------|--------------|
| 1 | Loss of network connectivity | 5 |
| 2 | Loss of system power/Kernel power event reported | 40 |
| 3 | Software issue on the physical host | 15 |
| 4 | Hardware issue on the physical host | 30 |
| 5 | Critical events reported in syslog | 40 |
| 6 | Kernel panic or taint reported in syslog | 10 |
| 7 | IO error reported in syslog or key service logs | 40 |
| 8 | Disk corruption/bad sectors/high usage being reported in file system scan | 40 |
| 9 | CPU/Memory beyond safe limit beyond allowed duration | 20 |

These indicators may be used to derive a weighted sum as an indication of system health:

$$SysStat = \sum_{k=1}^{n} w[k]$$

The indicators in the table above may indicate a possibility of issues on the cloud platform's physical server rack that may affect one or more cloud instances in the user cloud computing environment. Therefore, an intelligent policy can derive for such system status checks and indicators and calculate the SysStat score based on the above weightage for each indicator to obtain an overall failure indication and prediction score. A threshold value of the score may be used to determine whether backup should be automatically triggered by the ICCEBRC. For example, if SysStat≥50, an intelligent policy-driven backup may be triggered.

In another alternative or additional implementation, the intelligent policy can determine a key system configuration change schedule and take a backup just before or after the change occurs. The following are exemplary key system changes which comes under this category with assigned weightages. The description in the parenthesis following the description of a parameter indicates when a backup should be taken when the backup is triggered by that particular parameter.

| # | Parameter | Weightage(W) |
|---|---|---|
| 1 | Modification of system storage. Addition of storage (After Addition) | 10 |
| 2 | Removal of storage systems. (Before Removal) | 20 |
| 3 | Modification of network configuration and subnets etc. (Before modification) or Security group/firewall rules and VPN related changes | 20 |
| 4 | CPU/Memory is scaled up or down | 10 |

These key system configuration change parameters may be analyzed as a combined weightage score:

$$SysChg = \sum_{k=1}^{n} w[k]$$

In one implementation, the ICCEBRC may determine that the value of SysChgT is beyond a threshold value of, e.g., 20, (i.e., Chg≥20) and automatically trigger a backup. This will help provide safeguard in the event the change causes an unplanned outage, restoring a server to a prior, stable state.

Apart from the system status and critical system changes, there are a few more system events that an intelligent policy may monitor in real-time for triggering backup. For example, the intelligent policy may monitor software patching and software updates. In particular, server patching and updating constitute a maintenance activity necessary to keep the server hardened against security vulnerabilities. However, this may also be a risky exercise which may result in un-planned downtime in the event something goes unexpected with a particular patch or software update. An intelligent policy can monitor the patching schedule and take preventive backup of server just before the software patching or update. In case the server is not back online by the time a patching schedule is calculated to be over, the intelligent policy can sense this as a patching failure and automatically run a restoration of the instance to bring the server back online with its last known good state. This will enable trouble free patching and maintenance so that when the patching or update fails there is an automatic fallback in place to keep the system operational.

In another example, the intelligent policy may monitor antivirus/malware scans. After a comprehensive system scan with all possible threats removed, the system may be in a clean state and may be in an ideal state for a backup. The intelligent policy can trigger this backup according to the antivirus/malware scan activity to ensure the backed-up state is safe and free of possible virus or malware. These backup versions or snapshots may be tagged as clean and be preferably used during restoration.

For yet another example, the intelligent policy may monitor accidental removal or outage. If a cloud instance is accidentally deleted or goes down unplanned, the intelligent policy may attempt to restore it and bring it back online from the last known good state.

In another implementation of the intelligent policy, the above described monitoring actions (patching and software update, antivirus and malware scans, and accidental removal or outage) may be combined into weighted sum, Othr=$\sum_{k=1}^{n}$ w[k], as a score for determining whether to trigger a backup, as shown in the example in the table below. Backup can be triggered if the summation is equal of more than a defined threshold of, e.g., 20 (i.e., Othr≥20).

| # | Parameter | Weightage(W) |
|---|---|---|
| 1 | Patching and Software update | 10 |
| 2 | Antivirus and Malware scans | 20 |
| 3 | Accidental removal or outage triggers recovery: | 20 |

Aside from the intelligence policy-based backup/restoration discussed above, the ICCEBRC above may further provide disaster recovery backup capabilities. In particular, for a cloud platform, a geographic region may be affected by an outage. In the event of such an outage, users who are running time critical applications on cloud components located in that region are affected the most and the only alternative for operational continuity is to shift the computing resources to an alternative geographic region unaffected by the outage. ICCEBRC may provide such shift by implementing a disaster recovery DR policy. In one implementation of DR policy, a user may be provided capability to choose one or more regions as DR regions so that a copy of all backup taken in the source region will also be linked and sent to the DR regions. In the event the source region goes down, alternate instances can be spawn in the DR regions from the DR snapshots copied from the source region.

Returning to FIG. 4, the ICCEBRC makes API calls to the cloud computing platforms for executing backup/restoration via the controller/service layer 406, once a backup/restoration action is triggered via any of the pathways in FIG. 5. The API calls may be made via the user cloud computing environments. As such, the task of taking actual backup may be handed over to the respective cloud agent components to the extent possible. For example, GCP™ platform may have an application engine which will schedule the backups in GCP™ platform. Similarly, in AWS™ environment, AWS Lambda™ can be deployed per client environment to take the scheduled backup. In Azure™, the platform itself schedules and takes the backup of the scheduled instances and the ICCEBRC may only need to call to provide the schedule according to the static rules and call for backup/restoration triggered via the intelligent pathway of FIG. 5 in real-time.

Particularly for AWS™ platform, each of the instance which is scheduled or triggered for backup, can have certain tags which will be picked up by AWS™ during its periodic polling of cloud instances. AWS Lambda™, for example, may read these tags to know when the instance is scheduled for backup and whether the backup schedule/policy is active or not and whether there is a DR needed to be maintained for the instance and if yes, to which region Lambda™ should copy the replication snapshots. Based on these parameters, AMS Lambda™ will take backup and make DR copies of snapshots of the instances.

Particularly for Azure™ cloud platform, backup policies may be created by instantiating an Azure™ REST service, with the relevant schedule frequency and retention range passed to Azure™ by REST calls. Each item scheduled for backup is attached to specific backup policies depending on schedule. All items that are attached to these backup policies are automatically picked up by an Azure™ internal job for running the backup according to the specific schedule frequency.

The GCP platform also follows a cloud based backup scheduler to control backups. The ICCEBRC may deploy an application in the user GCP cloud computing environment. This application may monitor the GCP instances for tags to find and schedule backups for the instances.

Figure 7:
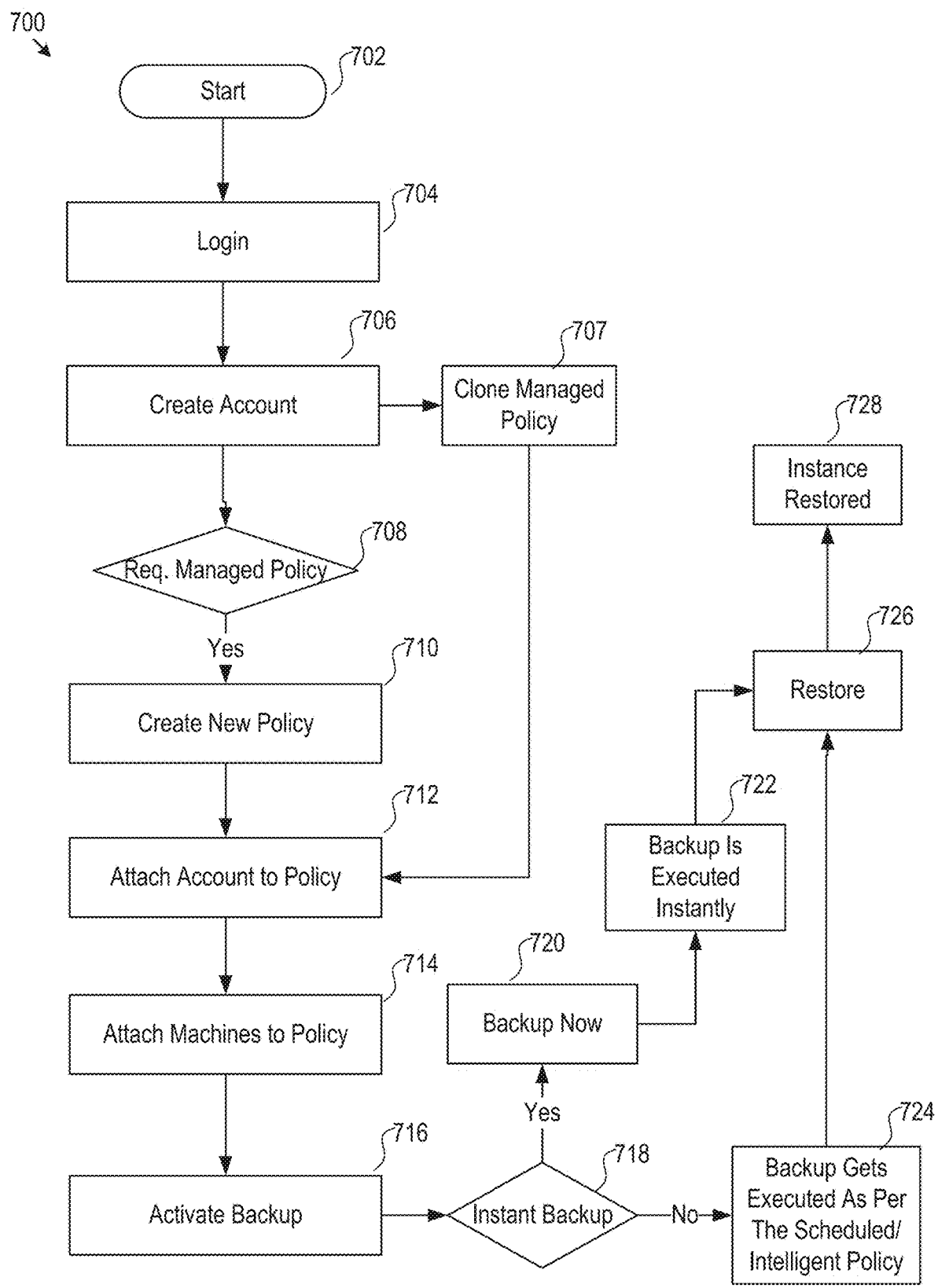
FIG. 7 shows an exemplary logic flow of an intelligent cloud computing environment backup and recovery application from a user standpoint.

The three-tier ICCEBRC of FIG. 3, once deployed, may be accessed by the user device 120. In one implementation, a dedicated application may be installed on the user device for such access. In some other implementations, the UI tier may be implemented as a web server and the user may access the ICCEBRC via a web browser. FIG. 7 shows an exemplary application logic flow 700 from the user perspective.

As shown in FIG. 7, the user may log in to the ICCEBRC application from the user device using preassigned credentials (704). These credentials can be maintained in a credential management system (not shown). An account may be created for each cloud computing environment that needs to be added for backup support (706). Once the account is created, policies (including static-rule based and intelligent policies), if needed/required, can be created and attached to account to enable account for executing backup (708, 710, and 712). Each policy may be associated with an account and each account may be associated with one or more policies. A policy, once created, may be cloned from one cloud computing environment to attach to another cloud computing environment (707). The user may further modified the cloned policy before attachment to an account (or instance, see below). Once policies are attached to an account, a user can attach cloud instances to policies to mark those instances for backup (714). A policy can be attached to one or more instances. Different policies can be attached to the same instance. User may activate these backups from dashboard (716) and the instances are enabled for backup and will be backed up per the policies (724). The user may be further provided visualization interface in ICCEBRC to view the policies. Instant or on-demand backups are also possible from the backup dashboard (718, 720, and 722). Restoration of instances from backup is also possible from the backup dashboard by selecting restore action and selecting the appropriate recovery point from the subsequent recovery point dialog (726 and 728). Users can detach the instances from the policies if the instances are no longer required to be backed up (now shown in FIG. 7). Once all the instances are detached from a policy, the policy can be detached from an account (now shown in FIG. 7). If required the account can be deleted subsequently if it is not required (now shown in FIG. 7).

The various implementations of the ICCEBRC above thus provide and integrated intelligent and analytics-based backup/restoration for an actively deployed user cloud computing environment. The backup/restoration solutions disclosed herein include following features.

The ICCEBRC disclosed above includes a user-friendly portal for managing and monitoring backup/restoration of the machines for different cloud platforms. It creates multiple versions of snapshot of volumes of instances and makes them available for the user to take backups from.

The ICCEBRC disclosed above enables configurable backup/restoration policy. In particular, it permits users to define policies including various parameters of the backup such as the time of scheduling, the retention duration for which the snapshots should be retained in the system, the frequency of the backup (Daily/Weekly) etc. Once a backup is scheduled for any defined time, it can also be deactivated to suspend the execution of backup temporarily and can be activated again when desired to resume the backup execution as per the policy schedule.

ICCEBRC disclosed above provides instant or on-demand back functions. For example, the user may request on-demand backup at any time. The ICCEBRC may further maintain original snapshots of instances and the user may request restoration to the original instances, similar to backup/restoration of bare metal instances from the backup disk images.

The ICCEBRC disclosed above provide multi-level (software or hardware) backup/restoration. For example, the ICCEBRC allows for software level backup and data backup for several analytics and cloud managed services like Hadoop, Datastax, Dynamo DB (Cloud database).

The ICCEBRC disclosed above further provide intelligent auto failure discovery and recovery policies and function. In particular, apart from the static backup/restoration rules, the ICCEBRC also allows the user to define an intelligent policy and associate it with the backup job. When selected in combination with a regular static policy, the intelligent policy can work with the regular static policy to monitor and prioritize backup of cloud resources. The intelligent policies may be based on dynamic rules against real-time operational status, e.g., under the intelligent policies, the ICCEBRC may perform a continuous monitoring of key health parameters of the instances/clusters like storage usage, processor and memory utilization, and file system health, and compared the monitoring results with the dynamic rules for triggering backup/restoration. The intelligent policies may be analytics based, e.g., fault analytics will be performed on the key system logs (including kernel and process logs and event logs). If a probable system instability is identified a preventive backup and restoration is done to keep the operations intact. The problematic node will be overridden and decommissioned from service and kept aside for analysis. Analytics performed may include but not limited to CPU bugs/patches reported in kernel logs or event logs; corruption detection (using file system block level scan in idle hours); IO congestion, write failure etc. reported by system software; software components health status (database system health, average query performance); and other exemplary parameters and indicators discussed above.

The ICCEBRC disclosed above further allows users to restore the cloud instances as per the latest available backup. The tool also allows users to restore some earlier versions of an instance by providing the flexibility of selecting among the list of available recovery points. The ICCEBRC may retain backup versions according to a retention duration which automates the deletion of older snapshots after the defined retention duration time.

The ICCEBRC disclosed above may comprise software and technology stacks across or within the various deployment tiers (e.g., three-tiers in FIG. 3). In an exemplary implementation, the components in the software and technology stacks may including but not limited to Eclipse Neon™.3 Release (4.6.3), Oracle™ JDK 8 64-bit version 1.8.0_144; Google Cloud™ SDK (Including beta version commands) version 168.0.0; Google Cloud tools for Eclipse™ 1.3.1; Google bundled Jetty server (Included in Google Cloud tools and App engine local and cloud computing environment) Spring™ 4.3.0. release; Quartz Scheduler™ 2.3.0; Amazon Web Services™ sdk 1.11.141; Apache Maven™-3.3.9; PMD™-4.2.4; Checkstyle-5.0; Apache Tomcat™-8.5.16; Gitlab™; Azure Rest™ API-2016-06-01, 2016-04-30-preview; Mongo DB™-3.4.6; Postman™ test dependencies; Junit™ 4.12 spring test 4.3.0. Release; Java™ (Version 1.8).

Figure 8:
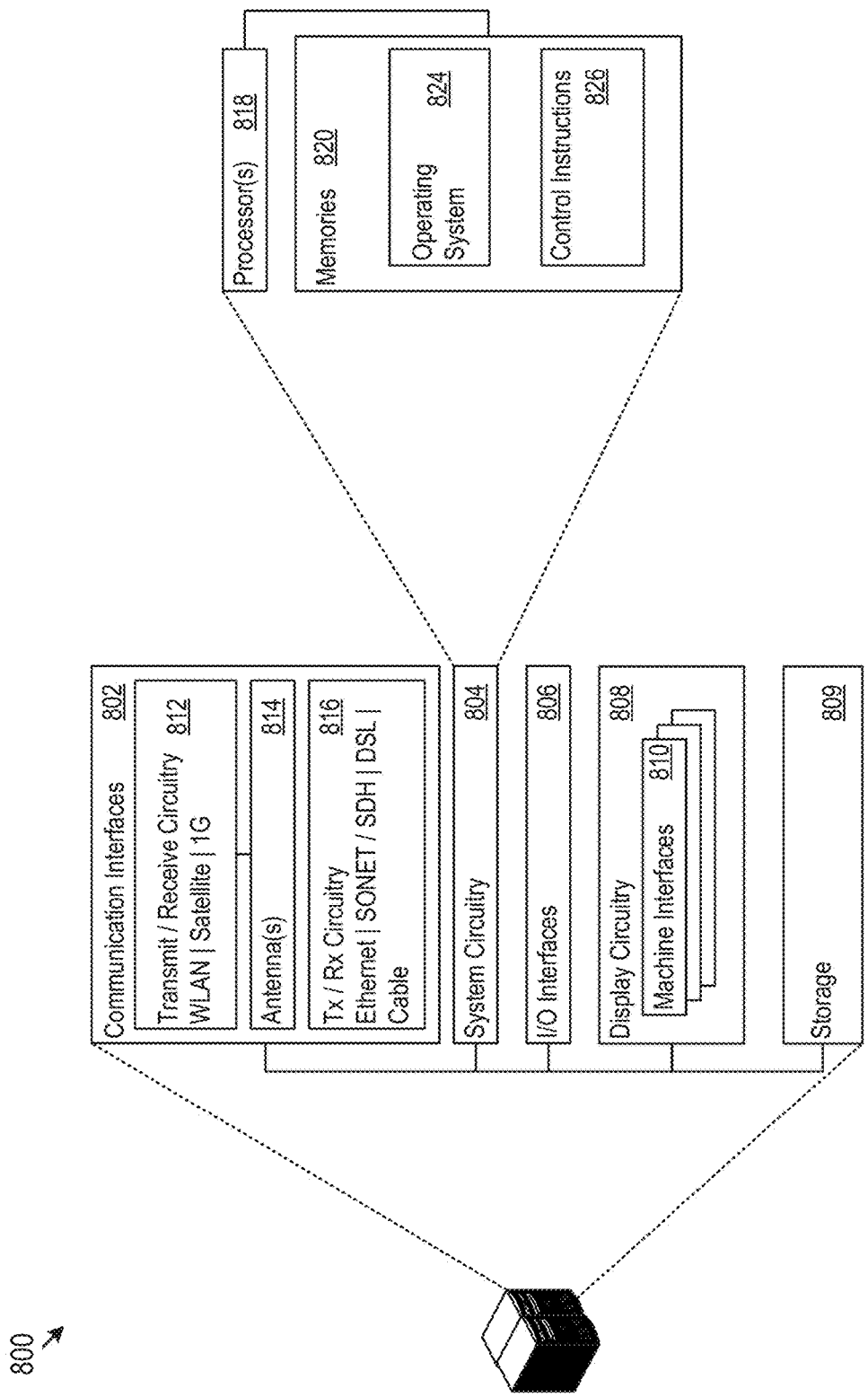
FIG. 8 shows an exemplary computing circuitry for implementing computing components of the ICCEBRC of FIGS. 1 and 2.

Finally, the computing resources for supporting the functioning of the cloud control and management circuitry 106 (including ICCEBRC 116 and CCEAS 118 and), either dedicated or from the cloud, may be based on the computer system 800 shown in FIG. 8. The computer system 800 may include communication interfaces 802, system circuitry 804, input/output (I/O) interfaces 806, storage 809, and display circuitry 808 that generates machine interfaces 810 locally or for remote display, e.g., in a web browser running on a local or remote machine. The machine interfaces 810 and the I/O interfaces 806 may include GUIs, touch sensitive displays, voice or facial recognition inputs, buttons, switches, speakers and other user interface elements. Additional examples of the I/O interfaces 806 include microphones, video and still image cameras, headset and microphone input/output jacks, Universal Serial Bus (USB) connectors, memory card slots, and other types of inputs. The I/O interfaces 806 may further include magnetic or optical media interfaces (e.g., a CDROM or DVD drive), serial and parallel bus interfaces, and keyboard and mouse interfaces.

The communication interfaces 802 may include wireless transmitters and receivers ("transceivers") 812 and any antennas 814 used by the transmitting and receiving circuitry of the transceivers 812. The transceivers 812 and antennas 814 may support Wi-Fi network communications, for instance, under any version of IEEE 802.11, e.g., 802.11n or 802.11ac. The communication interfaces 802 may also include wireline transceivers 816. The wireline transceivers 816 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 809 may be used to store various initial, intermediate, or final data or model needed for the cloud control and management circuitry 806. The storage 809 may be centralized or distributed, and may be local or remote to the computer system 800.

The system circuitry 804 may include hardware, software, firmware, or other circuitry in any combination. The system circuitry 804 may be implemented, for example, with one or more systems on a chip (SoC), application specific integrated circuits (ASIC), microprocessors, discrete analog and digital circuits, and other circuitry. The system circuitry 804 is part of the implementation of any desired functionality related to the cloud control and management circuitry 106. As just one example, the system circuitry 804 may include one or more instruction processors 818 and memories 820. The memories 820 stores, for example, control instructions 826 and an operating system 824. In one implementation, the instruction processors 818 executes the control instructions 826 and the operating system 824 to carry out any desired functionality related to the cloud control and management circuitry 106.

As such, the implementation above may provide a uniform interface for managing backup and restoration of the cloud computing environment. It may communicate with the various cloud platforms and take advantage of and adapt to the disparate levels of backup support provided by the various cloud computing platforms, and provide other necessary layers and analytics to achieve fully automated intelligent backup and restoration management of a cloud computing environment. It thus shields organizational or individual users from underlying disparate backup schemes of various cloud computing platforms and provides a complete automatic backup management solution regardless of whether any level of backup is supported by the cloud computing platforms.

In one implementation, a system for real-time backup of a target cloud computing environment is disclosed. The system may include a first processing circuitry in communication with the target cloud computing environment. The first processing circuitry may be configured to identify a set of static backup rules specified in a rule repository; attach the set of static backup rules to computing entities of the target cloud computing environment; receive a plurality of operating status of the target cloud computing environment; perform analytics on the plurality of operating status using a multilayer analytics stack to obtain a set of parameters; obtain at least one triggering signal based on the set of parameters for performing a backup of one of at least one instance in the target cloud computing environment separate from a backup specified according to the set of static backup rules; identify a cloud computing platform associated with the one of the at least one instance of the target cloud computing environment; automatically generate a backup command corresponding to the cloud computing platform; and communicate the backup command to the cloud computing platform to cause the cloud computing platform create a backup of the one of the at least one instance of the target cloud computing environment.

In the implementation above, the backup of the one of the at least one instance created by the cloud computing platform may reside both in an original geographic location of a corresponding source cloud computing instance of the target cloud computing environment and at a different geographic location from the original geographic location.

In any of the implementations above, the first processing circuitry may be further configured to detect a disaster condition at the original geographical location and causes the cloud computing platform to restore the one of the at least one instance at the different geographic location when the disaster condition is detected.

In any of the implementations above, the first processing circuitry may be located in another cloud computing environment separate from the target cloud computing environment.

In any of the implementations above, the another cloud computing environment may be implemented as a persistent computing environment while the target cloud computing environment is instantiated and decommissioned as needed.

Any of the implementations above may further comprises a second processing circuitry, wherein the second processing circuitry is configured to interact with a user via a user portal for obtaining the set of static backup rules and for visualizing the plurality of operating status of the target cloud computing environment and backup progresses.

In any of the implementations above, the second processing circuitry may be implemented within the target cloud computing environment whereas the first processing circuitry may be implemented in another cloud computing environment separate from the target cloud computing environment.

In any of the implementations above, the triggering signal is generated based on a comparison of the one of the set of parameters to a threshold value.

In any of the implementations above, the triggering signal may be generated based on a comparison of a weighted sum of at least one of the set of parameters to a threshold value.

In any of the implementations above, the backup command may be communicated to the cloud computing platform via an Application Programing Interface (API).

In any of the implementations above, the target cloud computing environment may include cloud computing resources provided by two or more disparate cloud computing platforms and the first processing circuitry may be further configured to identify a second cloud computing platform associated with another of the at least one instance of the cloud computing environment; automatically generate another backup command corresponding to the second cloud computing platform; and communicate the another backup command to the second cloud computing platform to cause the second cloud computing platform to create a backup of the another of the at least one instance.

In any of the implementations above, the at least one triggering signal may be derived from the set of parameters using a predict model trained using a machine learning algorithm and historical data collected by the first processing circuitry from the cloud computing environments previous deployed and similar to the target cloud computing environment.

In any of the implementations above, the at least one triggering signal may indicate a potential failure of the one of the at least one instances.

In another implementation, a method for real-time backup of a target cloud computing environment is disclosed. The method may include identifying a set of static backup rules specified in a rule repository; attaching the set of static backup rules to computing entities of the target cloud computing environment; receiving a plurality of operating status of the target cloud computing environment; performing analytics on the plurality of operating status using a multilayer analytics stack to obtain a set of parameters; obtaining at least one triggering signal based on the set of parameters for performing a backup of one of at least one instance in the target cloud computing environment separate from a backup specified according to the set of static backup rules; identifying a cloud computing platform associated with the one of the at least one instance of the target cloud computing environment; automatically generating a backup command corresponding to the cloud computing platform; and communicating the backup command to the cloud computing platform to cause the cloud computing platform create a backup of the one of the at least one instance of the target cloud computing environment.

In any of the implementations above, the backup of the one of the at least one instance created by the cloud computing platform may reside both in an original geographic location of a corresponding source cloud computing instance of the target cloud computing environment and at a different geographic location from the original geographic location.

Any of the methods above may be implemented in another cloud computing environment separate from the target cloud computing environment.

In any of the methods above, the another cloud computing environment may be implemented as a persistent computing environment while the target cloud computing environment is instantiated and decommissioned as needed.

In any of the methods above, the target cloud computing environment may include cloud computing resources provided by two or more disparate cloud computing platforms. The method may further include: identifying a second cloud computing platform associated with another of the at least one instance of the cloud computing environment; automatically generating another backup command corresponding to the second cloud computing platform; and communicating the another backup command to the second cloud computing platform to cause the second cloud computing platform to create a backup of the another of the at least one instance.

In any of the methods above, the at least one triggering signal may be derived from the set of parameters using a predict model trained using a machine learning algorithm and historical data collected from the cloud computing environments previous deployed and similar to the target cloud computing environment.

In any of the methods above, the triggering signal may be generated based on a comparison of a weighted sum of at least one of the set of parameters to a threshold value.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in tangible storage media that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on other machine-readable media. The media may be made-up of a single (e.g., unitary) storage device, multiple storage devices, a distributed storage device, or other storage configuration. A product, such as a computer program product, may include storage media and instructions stored in or on the media, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system for real-time backup of an actively deployed target cloud computing environment, comprising a first processing circuitry in communication with the actively deployed target cloud computing environment, the first processing circuitry configured to:

identify a set of static backup rules specified in a rule repository;

attach the set of static backup rules to computing entities of the actively deployed target cloud computing environment;

receive a plurality of operating status of the actively deployed target cloud computing environment using a plurality of monitoring agents distributed within the target cloud computing environment;

perform analytics on the plurality of operating status using a multilayer analytics stack to obtain a set of parameters including at least predictive indicators for loss of network connectivity, disk corruption, and CPU/Memory over-usage;

obtain a backup triggering signal and a backup level based on weighing the set of parameters using a predetermined set of weights for performing a backup of the actively deployed target cloud computing environment in addition to backups specified according to the set of static backup rules, wherein the backup level comprises one of individual software application level, software stack level, virtual machine level, or an entire cloud computing environment level, and wherein the backup triggering signal is derived from the set of parameters using a predict model trained using a machine learning algorithm and historical data collected by the first processing circuitry from the cloud computing environments previous deployed and similar to the actively deployed target cloud computing environment;

identify a cloud computing platform associated with the backup level of the actively deployed target cloud computing environment;

automatically generate a backup command corresponding to the cloud computing platform; and communicate the backup command to the cloud computing platform to create a backup snapshot of at least one instance of the actively deployed target cloud computing environment comprising a description of a current hardware and software composition and a current runtime status at the backup level to facilitate a restoration of the actively deployed target cloud computing environment to the current run time status.

2. The system of claim 1, wherein the backup snapshot of the at least one instance created by the cloud computing platform resides both in an original geographic location of a corresponding source cloud computing instance of the actively deployed target cloud computing environment and at a different geographic location from the original geographic location.

3. The system of claim 2, wherein the first processing circuitry is further configured to detect a disaster condition at the original geographical location and causes the cloud computing platform to restore the at least one instance at the different geographic location when the disaster condition is detected.

4. The system of claim 1, wherein the first processing circuitry is implemented in another cloud computing environment separate from the actively deployed target cloud computing environment.

5. The system of claim 4, wherein the another cloud computing environment is implemented as a persistent computing environment while the actively deployed target cloud computing environment is instantiated and decommissioned as needed.

6. The system of claim 1, further comprising a second processing circuitry, wherein the second processing circuitry is configured to interact with a user via a user portal for obtaining the set of static backup rules and for visualizing the plurality of operating status of the actively deployed target cloud computing environment and backup progresses.

7. The system of claim 6, wherein the second processing circuitry is implemented within the actively deployed target cloud computing environment whereas the first processing circuitry is implemented in another cloud computing environment separate from the actively deployed target cloud computing environment.

8. The system of claim 1, wherein the backup triggering signal is generated based on a comparison of the one of the set of parameters to a threshold value.

9. The system of claim 1, wherein the backup triggering signal is generated based on a comparison of a weighted sum of at least one of the set of parameters to a threshold value.

10. The system of claim 1, wherein the backup command is communicated to the cloud computing platform via an Application Programing Interface (API).

11. The system of claim 1, wherein the actively deployed target cloud computing environment comprises cloud computing resources provided by two or more disparate cloud computing platforms and the first processing circuitry is further configured to:

identify a second cloud computing platform associated with the backup;

automatically generate another backup command corresponding to the second cloud computing platform; and communicate the another backup command to the second cloud computing platform to cause the second cloud computing platform to create another backup snapshot of at least another instance in the second cloud computing platform.

12. The system of claim 1, wherein the backup triggering signal indicates a potential failure of the at least one instance.

13. A method performed by a processing circuitry for real-time backup of an actively deployed target cloud computing environment, comprising:

identifying a set of static backup rules specified in a rule repository;

attaching the set of static backup rules to computing entities of the actively deployed target cloud computing environment;

receiving a plurality of operating status of the actively deployed target cloud computing environment using a plurality of monitoring agents distributed within the target cloud computing environment;

performing analytics on the plurality of operating status using a multilayer analytics stack to obtain a set of parameters including at least predictive indicators for loss of network connectivity, disk corruption, and CPU/Memory over-usage;

obtaining a backup triggering signal and a backup level based on weighing the set of parameters using a predetermined set of weights for performing a backup of the actively deployed target cloud computing environment in addition to backups specified according to the set of static backup rules, wherein the backup level comprises one of individual software application level, software stack level, virtual machine level, or an entire cloud computing environment level, and wherein the backup triggering signal is derived from the set of parameters using a predict model trained using a machine learning algorithm and historical data collected by the first processing circuitry from the cloud computing environments previous deployed and similar to the actively deployed target cloud computing environment;

identifying a cloud computing platform associated with the backup level of the actively deployed target cloud computing environment;

automatically generating a backup command corresponding to the cloud computing platform; and communicating the backup command to the cloud computing platform to create a backup snapshot of at least one instance of the actively deployed target cloud computing environment comprising a description of a current hardware and software composition and a current runtime status at the backup level to facilitate a restoration of the actively deployed target cloud computing environment to the current run time status.

14. The method of claim 13, wherein the backup snapshot of the at least one instance created by the cloud computing platform resides both in an original geographic location of a corresponding source cloud computing instance of the actively deployed target cloud computing environment and at a different geographic location from the original geographic location.

15. The method of claim 13, wherein the method is implemented in another cloud computing environment separate from the actively deployed target cloud computing environment.

16. The method of claim 15, wherein the another cloud computing environment is implemented as a persistent computing environment while the actively deployed target cloud computing environment is instantiated and decommissioned as needed.

17. The method of claim 13, wherein the actively deployed target cloud computing environment comprises cloud computing resources provided by two or more disparate cloud computing platforms, the method further comprising:

identifying a second cloud computing platform associated with the backup;

automatically generating another backup command corresponding to the second cloud computing platform; and communicating the another backup command to the second cloud computing platform to cause the second cloud computing platform to create another backup snapshot of at least another instance in the second cloud computing platform.

18. The method of claim 13, wherein the backup triggering signal is generated based on a comparison of the one of the set of parameters to a threshold value.

* * * * *